United States Patent
Baudot et al.

(10) Patent No.: US 12,541,059 B2
(45) Date of Patent: Feb. 3, 2026

(54) MANAGING BACK-SIDE PROCESSING OF PHOTONIC INTEGRATED CIRCUITS

(71) Applicant: Ciena Corporation, Hanover, MD (US)

(72) Inventors: Charles Baudot, Quebec (CA); Alexandre D. Simard, Quebec (CA); Elnaz Afsharipour, Quebec (CA); Jonathan Cauchon, Lévis (CA)

(73) Assignee: Ciena Corporation, Hanover, MD (US)

( * ) Notice: Subject to any disclaimer, the term of this patent is extended or adjusted under 35 U.S.C. 154(b) by 313 days.

(21) Appl. No.: 18/525,520

(22) Filed: Nov. 30, 2023

(65) Prior Publication Data
US 2025/0180804 A1     Jun. 5, 2025

(51) Int. Cl.
| G02F 1/13 | (2006.01) |
| G02B 6/13 | (2006.01) |
| G02B 6/42 | (2006.01) |
| G02F 1/035 | (2006.01) |

(52) U.S. Cl.
CPC .............. *G02B 6/13* (2013.01); *G02B 6/4224* (2013.01); *G02B 6/4225* (2013.01); *G02B 6/4227* (2013.01); *G02F 1/0356* (2013.01)

(58) Field of Classification Search
CPC ...... G02B 6/13; G02B 6/4224; G02B 6/4225; G02B 6/4227; G02F 1/0344; G02F 1/035; G02F 1/0356; G02F 1/2255
USPC .......................................... 385/1–3, 14, 131
See application file for complete search history.

(56) References Cited

U.S. PATENT DOCUMENTS

| 9,804,475 | B1 * | 10/2017 | Parker ................... H10F 39/806 |
| 10,527,796 | B2 * | 1/2020 | Spannagel .............. G02B 6/34 |
| 11,227,790 | B1 | 1/2022 | Filion et al. |
| 11,762,146 | B2 | 9/2023 | Watts et al. |
| 2002/0126932 | A1 * | 9/2002 | Minakata ............... G02F 1/2255 385/2 |
| 2013/0181233 | A1 * | 7/2013 | Doany .............. H01L 21/76251 257/E33.073 |
| 2017/0237229 | A1 | 8/2017 | Menezo |

* cited by examiner

*Primary Examiner* — Robert Tavlykaev
(74) *Attorney, Agent, or Firm* — Young Basile Hanlon & MacFarlane, P.C.

(57) ABSTRACT

An article of manufacture comprises a bottom volume comprising a first region composed of a first material characterized by a first index of refraction (IOR) and having a first thickness, and thinned regions in which a portion of the first material is absent or has a thickness less than the first thickness; a middle volume on top of the bottom volume and comprising a second material characterized by a second IOR smaller than the first IOR; and a top volume on top of the middle volume and comprising alignment structures, and a photonic structure; where the top and middle volumes are in contact at an interface plane, and spatial coordinates specify two-dimensional positions, within at least one thinned region in a second plane parallel to the interface plane and with respect to the alignment structures, of portions of the photonic structure in a first plane parallel to the interface plane.

20 Claims, 12 Drawing Sheets

MANAGING BACK-SIDE PROCESSING OF PHOTONIC INTEGRATED CIRCUITS

TECHNICAL FIELD

This disclosure relates to managing back-side processing of photonic integrated circuits.

BACKGROUND

Complementary metal-oxide-semiconductor (CMOS) processes and other fabrication techniques can be used to fabricate electronic integrated circuits that operate using electrical signals (e.g., voltage signals and/or current signals). Similar fabrication techniques can be used to fabricate photonic integrated circuits (PICs) in a silicon photonic platform or in other integrated photonic platforms. A silicon on insulator platform is an example of a silicon photonic platform that can be used to make opto-electrical active devices, optical passive devices, and optical waveguides in a silicon layer. In a silicon on insulator platform, the optical signals can be transmitted by optical waveguides and can be confined within the silicon layer, for example, because there is an underlying buried oxide (BOX) layer made up of thermal silicon dioxide (i.e., silicon oxidized using a thermal process) and an overlying silicon dioxide cladding surrounding the silicon layers. The index contrast between the high refractive index silicon and low refractive index silicon dioxide is responsible for the confinement. Some advantages of silicon photonic platforms are the ability to make both active and passive devices, and the ability to make compact PICs due to the high index contrast between silicon and silicon dioxide.

SUMMARY

In one aspect, in general, an article of manufacture comprises a bottom volume of a photonic integrated circuit, the bottom volume comprising a first region composed of a first material characterized by a first index of refraction and having a first thickness, and one or more thinned regions in which at least a portion of the first material is absent or has a thickness less than the first thickness; a middle volume of the photonic integrated circuit, located on top of the bottom volume, the middle volume comprising a second material characterized by a second index of refraction smaller than the first index of refraction; and a top volume of the photonic integrated circuit, located on top of the middle volume, the top volume comprising one or more alignment structures, and a first photonic structure in a set of photonic structures; where the top volume and the middle volume are in contact at an interface plane; where a first set of spatial coordinates specify one or more two-dimensional positions, with respect to the alignment structures, of one or more portions of the first photonic structure in a first plane that is parallel to the interface plane; where the first set of spatial coordinates specify one or more two-dimensional positions, with respect to the alignment structures, within at least one thinned region in a second plane that is parallel to the interface plane.

Aspects can include one or more of the following features.

Where the first set of spatial coordinates are associated with a first shape of the first photonic structure in the first plane.

Where the middle volume further comprises a second region composed of the second material and having a second thickness; and one or more secondary thinned regions, located above respective thinned regions of the bottom volume, in which at least a portion of the second material is absent or has a thickness less than the second thickness.

Where the middle volume further comprises a third material, different from the second material, located in at least one of the one or more secondary thinned regions.

The article of manufacture further comprises metallic bumps located underneath the bottom volume.

In another aspect, in general, a method comprises securing a bottom volume of a photonic integrated circuit, located underneath a middle volume of the photonic integrated circuit, to a first tool portion at a first time; forming a first photonic structure in a top volume of the photonic integrated circuit, the top volume located on top of the middle volume; forming one or more alignment structures in the middle volume or in the top volume; forming a temporary handle on top of the top volume; detaching the photonic integrated circuit from the first tool portion; securing the temporary handle to a second tool portion at a second time; detecting an optical signal that traverses through the middle volume; removing one or more regions of a first material from the bottom volume based at least in part on the detected optical signal, and a first set of spatial coordinates specifying one or more two-dimensional positions, with respect to the alignment structures, of one or more portions of the first photonic structure; and detaching the photonic integrated circuit from the second tool portion; where the first material is characterized by a first index of refraction and the middle volume comprises a second material characterized by a second index of refraction smaller than the first index of refraction.

Aspects can include one or more of the following features.

The method further comprises forming a heating element in the top volume.

Where the bottom volume is secured to the first tool portion at the first time by electrostatic forces.

Where the temporary handle is secured to the second tool portion at the second time by electrostatic forces.

In another aspect, in general, a method comprises securing a bottom volume of a photonic integrated circuit, located underneath a middle volume of the photonic integrated circuit, to a first tool portion at a first time; forming a first set of photonic structures in a top volume of the photonic integrate circuit, the top volume located on top of the middle volume; forming a temporary handle on top of the top volume; detaching the photonic integrated circuit from the first tool portion; securing the temporary handle to a second tool portion at a second time; removing one or more regions of a first material from the bottom volume based at least in part on a first set of spatial coordinates specifying one or more two-dimensional positions of one or more portions of a photonic structure in the first set of photonic structures; detaching the photonic integrated circuit from the second tool portion; and securing the bottom volume to a third tool portion at a third time; where the first material is characterized by a first index of refraction and the middle volume comprises a second material characterized by a second index of refraction smaller than the first index of refraction.

Aspects can include one or more of the following features.

The method further comprises, after the third time, forming a second set of photonic structures within the photonic integrated circuit.

Where at least one of the photonic structures in the second set of photonic structures is located in the top volume.

Where at least one of the photonic structures in the second set of photonic structures is a through-chip via that passes completely through the photonic integrated circuit.

Where the first set of photonic structures comprises at least one of a metallic waveguide, an optical waveguide, or an electro-optical device.

The method further comprises, after the third time, removing the temporary handle.

The method further comprises, after the second time and before the third time, forming one or more layers of a third material in contact with the one or more removed regions.

Where the first tool portion is a portion of a first tool and the third tool portion is a portion of the first tool.

Where the second tool portion is a portion of the first tool.

Where the first tool portion and the third tool portion are the same.

Where the bottom volume is secured to the first tool portion at the first time and is secured to the third tool portion at the third time by electrostatic forces.

Aspects can have one or more of the following advantages.

The subject matter disclosed herein includes design and processing techniques that can reduce interaction-dependent losses and modifications in photonic integrated circuits (PICs) used, for example, in integrated optical transceiver systems. Such techniques allow for greater thermal, optical, and electrical isolation of devices from a handle (i.e., substrate) of a PIC by removing portions of the handle under specified areas (e.g., under metallic transmission lines, under spot-size converters, or under temperature-tunable optical devices). The footprint of the removed portions of the handle can be controlled to the specified areas and can be smaller than a footprint that may result from utilizing lateral etches of encapsulation layers and buried oxide (BOX) layers. Furthermore, the PIC can have enhanced mechanical stability because a controlled region of the handle is removed while maintaining the encapsulation layer, the BOX layer, and the remaining (i.e., non-removed) handle regions. Within the removed portions of the handle, a thin film of material (e.g., silicon dioxide) can be deposited to enable further processing. Furthermore, the removal of portions of the handle can be performed at the very far-end of fabrication.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
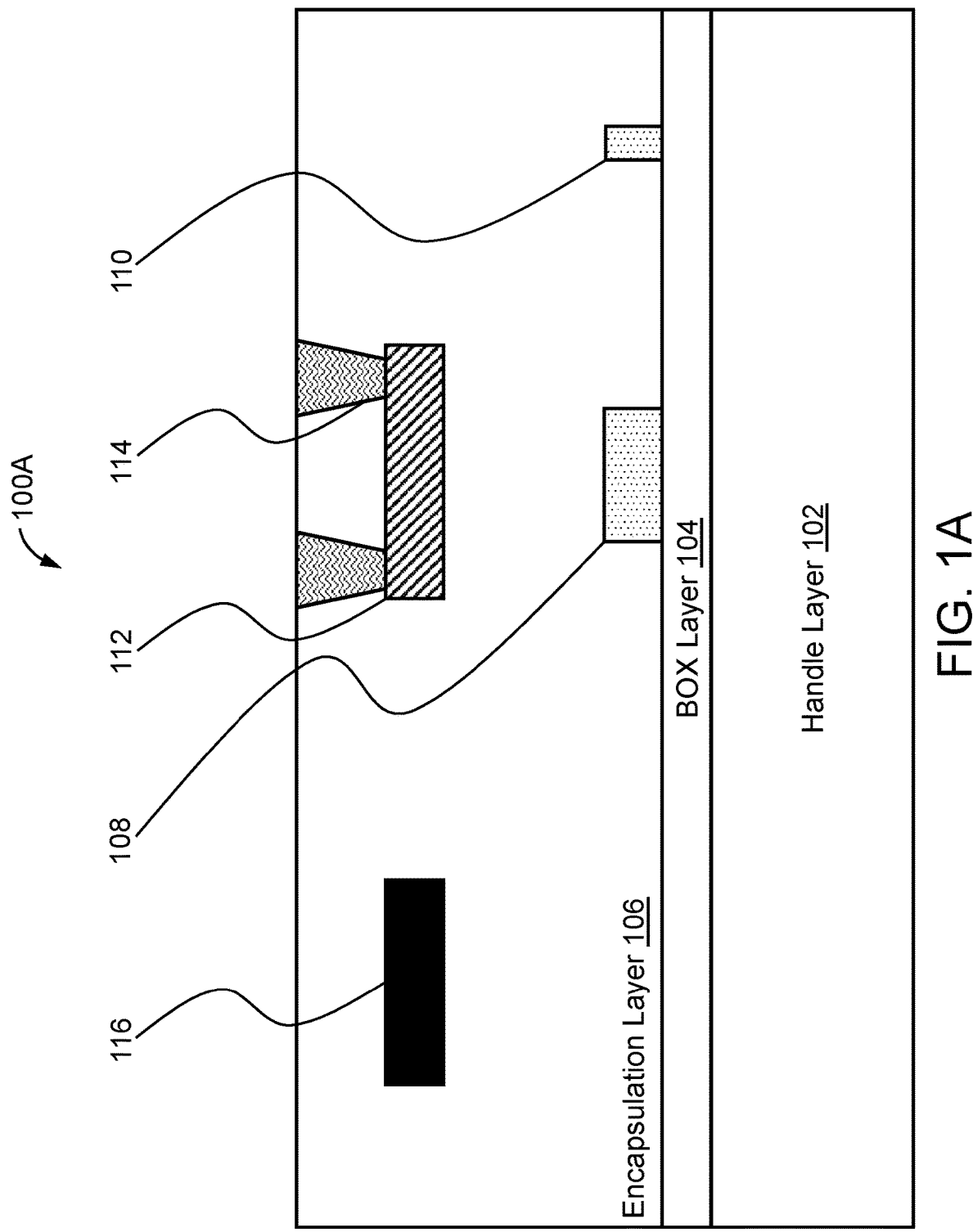
FIG. 1A is a schematic diagram of a cross-sectional view of an example PIC.

Some electromagnetic waves have a spectrum that has a peak wavelength that falls in a particular range of optical wavelengths (e.g., between about 100 nm to about 1 mm, or some subrange thereof), also referred to as optical waves, light waves, or simply light.

Typical integrated photonic platforms can comprise an active layer located on top of a buried oxide (BOX) layer. In turn, the BOX layer can be stacked on top of a handle, such as a silicon handle (i.e., a silicon substrate). There are various integrated photonic platforms now available, including silicon on insulator (SOI), lithium niobate on insulator (LNOI), and silicon nitride on insulator (SINOI). The active layers in each of the aforementioned integrated photonic platforms are Si, $LiNbO_3$, and SiN, respectively, and the term "insulator" refers to the electrical conductivity of the BOX layer. In general, the BOX layer can be used to isolate the active layer from the handle. However, due to wafer manufacturing and foundry processing constraints, the BOX layer may be limited in thickness. In general, the thickness of the BOX layer is on the order of several microns (e.g., between 1 and 10 μm). Consequently, optical, thermal, or electrical interactions can occur between the active layer and the handle. Such interactions can result in optical, thermal, or radio frequency (RF) losses or modifications that reduce system performance and that may be classified as intrinsic to the particular integrated photonic platform utilized. In some examples, performance requirements may be more stringent for integrated systems comprising integrated photonic platforms, such that reducing interaction-dependent losses (i.e., losses attributable to optical, thermal, or electrical interactions) can be valuable.

Interaction-dependent optical loss and modifications can occur, for example, when optically coupling an external optical fiber and a photonic integrated circuit (PIC). Optical mode matching at an interface between the optical fiber and a waveguide located within the PIC can be an important aspect of the integrated system, but can also be challenging due to differences between the optical fiber and the waveguide with respect to the optical mode size and the index of refraction. In some examples, a spot-size converter (SSC) may be used to expand the optical mode from the waveguide to the optical fiber, or to compress the optical mode from the optical fiber to the waveguide. In such examples, the optical mode propagating within the SSC can have a larger interaction with the surrounding materials (e.g., the handle) compared to the interaction of the optical mode within the waveguide. Consequently, a fraction of the optical mode propagating with the SSC can be coupled to the handle and thus lost within the handle.

Interaction-dependent thermal losses and modifications can occur, for example, in systems comprising heaters. In some examples, a temperature-tunable optical device may be co-packaged with or located in proximity to one or more heaters so as to tune the index of refraction of a waveguide within the temperature-tunable optical device, thereby providing control of the phase of an optical mode propagating within the waveguide. Thus, the ability to locally heat a temperature-tunable optical device and to limit the heat dissipation of the PIC can have a direct impact on the power consumption of the system. For example, some integrated photonic platforms confine optical modes within a waveguide by utilizing the active layer material (e.g., silicon) as a core and the insulator material (e.g., silicon dioxide) as a cladding. In such examples, the combination of the BOX layer and the cladding can result in the active layer being surrounded by one material (e.g., silicon dioxide). The thermal conductivity of silicon dioxide is typically 1.1 W/mK, while the thermal conductivity of silicon is typically 148 W/mK. Consequently, a silicon handle dissipates heat much more rapidly than silicon dioxide. Thus, larger volumes of a handle characterized by a thermal conductivity greater than the thermal conductivity of the insulator can require more heating to be provided by the heater, and therefore more electricity, so as to maintain a device at a specified temperature.

Interaction-dependent RF losses and modifications can occur, for example, in systems comprising high frequency electrical signals transmitted through metallic transmission lines, also referred to as metallic waveguides. At high frequencies (e.g., greater than 1 MHZ), electrical signals can propagate along the transmission line with a signal profile (i.e., an RF mode) that extends into the neighboring region surrounding the metal surface. Such electrical signals can be sensitive to any metallic environment (i.e., metal not comprised in the transmission line) that lies within the neighboring region. Since silicon possesses some metallic properties, a silicon handle can behave as a metallic environment that interferes with the electrical signal. Such interference can result in elevated RF propagation losses. Silicon also possesses other relevant properties (e.g., permittivity), which can modify the propagation constant of the electrical signal. Both of these effects can impact performance metrics for high frequency systems.

In some examples, interaction-dependent losses and modifications can be reduced by fabricating PICs that comprise a handle that is entirely composed of dielectric materials (e.g., quartz handles). However, such wafers are not standard in complementary metal-oxide-semiconductor (CMOS) foundries and can be incompatible with many tools utilized in such foundries. For example, CMOS foundries can use electrostatic chucks to pick up and hold wafers that contain materials that are at least partially electrically conductive (e.g., silicon handles). The electrostatic forces required for electrostatic chucks may not be readily achievable with quartz handles. Thus, adoption of entirely dielectric PICs may require development and customization of tools for a whole process line and dedication of that process line to a single product category. Such requirements may not be compatible with some CMOS business models that are oriented towards high yield, high volume production of various products on a generic production line and using standard processes.

In other examples, interaction-dependent losses and modifications can be reduced by fabricating PICs with large cavities formed by front-side processes. For example, a wet etch process can be utilized so as to undercut the handle at specified locations. In such examples, the footprint of the resulting cavity can be detrimentally large, thereby resulting in unnecessarily large exclusion zones that prevent placement of other photonic structures nearby. In terms of mechanical reliability, the resulting PIC may be fragile and may be prone to delamination and breaking. Furthermore, using front-side wet etching for removal of portions of the handle may be challenging to integrate with other processes (e.g., bumping processes).

FIG. 1A shows a cross-sectional view of an example PIC 100A comprising a handle layer 102, a BOX layer 104, and an encapsulation layer 106. The handle layer 102 comprises a first material (e.g., silicon), and in some examples has a thickness between 500 and 800 μm. The handle layer 102 can be important from a mechanical viewpoint, since it may be secured to a tool portion so as to hold the PIC 100A during manipulation and assembly while also preventing or reducing deformations. Thus, completely etching the handle layer 102 may not be feasible, or may result in additional fabrication and complexity. A temperature-tunable optical device 108 and a waveguide 110 are formed from an active layer comprising a second material that, in some examples, can be the same material as the first material (e.g., silicon). A heating element 112 is electrically connected to vias 114 and is located directly above the temperature-tunable optical device 108. A transmission line 116 is composed of a metallic material and can transmit RF electrical signals.

Referring again to FIG. 1A, in some examples, alignment structures (not shown) may be formed within the BOX layer 104 or within the encapsulation layer 106. Alignment of the PIC 100A during fabrication can ensure that devices and waveguides are properly oriented and positioned. In general, alignment structures can be generated on the front-side of the PIC 100A during normal processing so that they can be used as reference positions and as reference orientations of the PIC 100A.

Figure 1B:
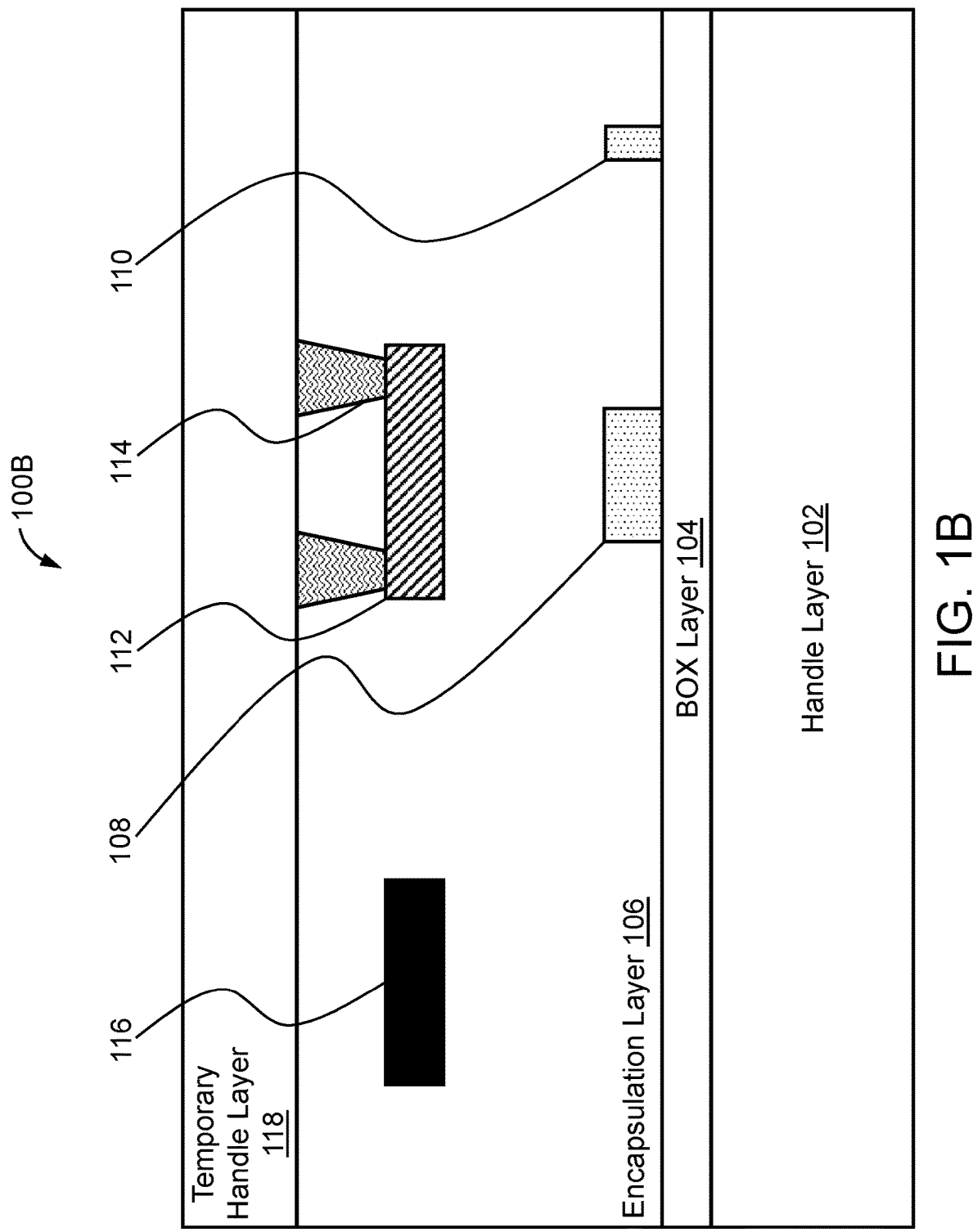
FIG. 1B is a schematic diagram of a cross-sectional view of an example PIC.

FIG. 1B shows a cross-sectional view of an example PIC 100B formed by adding a temporary handle layer 118 to the PIC 100A of FIG. 1A. The temporary handle layer 118 may be composed of glass or silicon, for example. In some examples, the PIC 100B can be picked up by securing a handle layer 102 to a pickup tool (e.g., an electrostatic chuck).

Figure 1C:
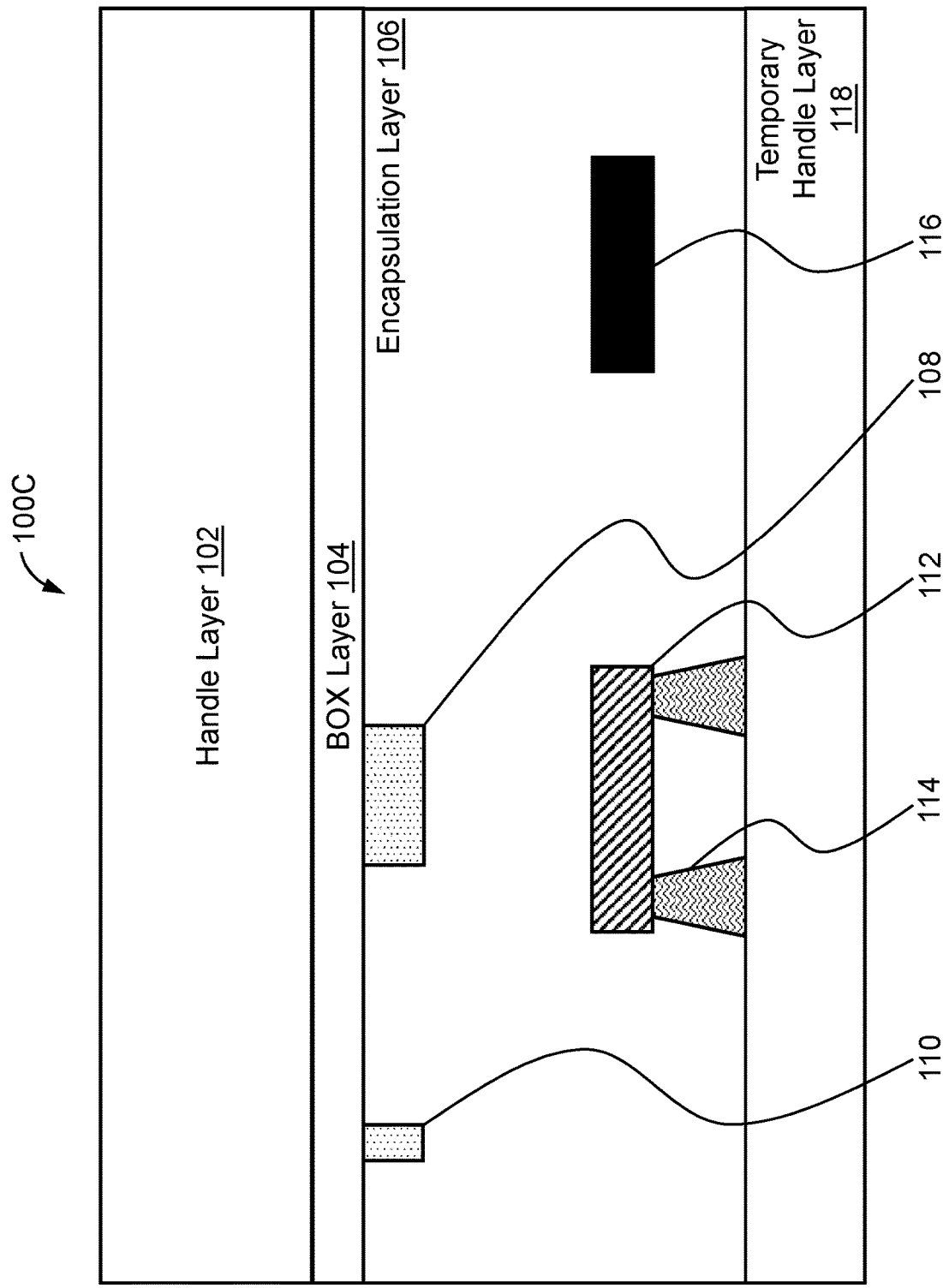
FIG. 1C is a schematic diagram of a cross-sectional view of an example PIC.

FIG. 1C shows a cross-sectional view of an example PIC 100C that results from flipping the PIC 100B of FIG. 1B. In some examples, the PIC 100C can be picked up by securing a temporary handle layer 118 to a pickup tool (e.g., an electrostatic chuck). In some examples, a handle layer 102 can undergo a backside grinding (BSG) process to remove a specified thickness of the handle layer 102. In such examples, the handle layer 102 may be thinned to a thickness between 100 and 300 μm, for example. In general, etching through the original thickness (i.e., before performing a BSG process) of the handle layer 102 can be challenging due to longer processing times and due to nonuniformities in the etching, which can result in etching through a BOX layer 104. The etch selectivity between silicon and silicon dioxide is typically on the order of 1:100. Thus, if an etch nonuniformity of 10% occurs when etching a thinned handle layer (i.e., after performing a BSG process) with a thickness of 200 μm, for example, some portions on the handle layer 102 may be completely removed by etching, under-etched portions of the handle layer 102 may have a thickness of 20 μm remaining, and over-etched portions of the handle layer 102 may also have 0.2 μm of the BOX layer 104 removed. If the BSG process has a nonuniformity of 10%, the over-etching of the BOX layer 104 may still be less than 1 μm, thereby preventing portions of the BOX layer 104 from being completely removed. If a BSG process is not performed, the nonuniformity of the etching described above would result in larger variations in thickness, but may still be within acceptable tolerances.

Referring again to FIG. 1C, in some examples, the PIC 100C comprises alignment structures (not shown) that can be used to ensure that the portions of the handle layer 102 that are removed (e.g., by etching) are located beneath the selected devices or features (e.g., under a temperature-tunable optical device 108, under a waveguide 110, or under a transmission line 116). The alignment structures may be imaged through a portion of the PIC 100C so as to provide reference positions and orientations for the removal of portions of the handle layer 102. In general, the alignment structures may be more easily imaged or provide higher accuracy, for fabrication purposes, if the handle layer 102 is thinned (e.g., by performing a BSG process), since the optical signal would travel through less material of the PIC 100C. In some examples, the alignment structures can be fabricated by using metal layers found in the back-end-of-line, or by using silicon, doped silicon, or silicide structures. Alignment structures fabricated from metal may be more easily imaged, especially if imaged through the handle layer 102 and the BOX layer 104. Furthermore, doped silicon and silicide structures may be more easily imaged than silicon structures due to their larger difference in index of refraction relative to the handle layer 102, which may be composed of silicon.

Figure 1D:
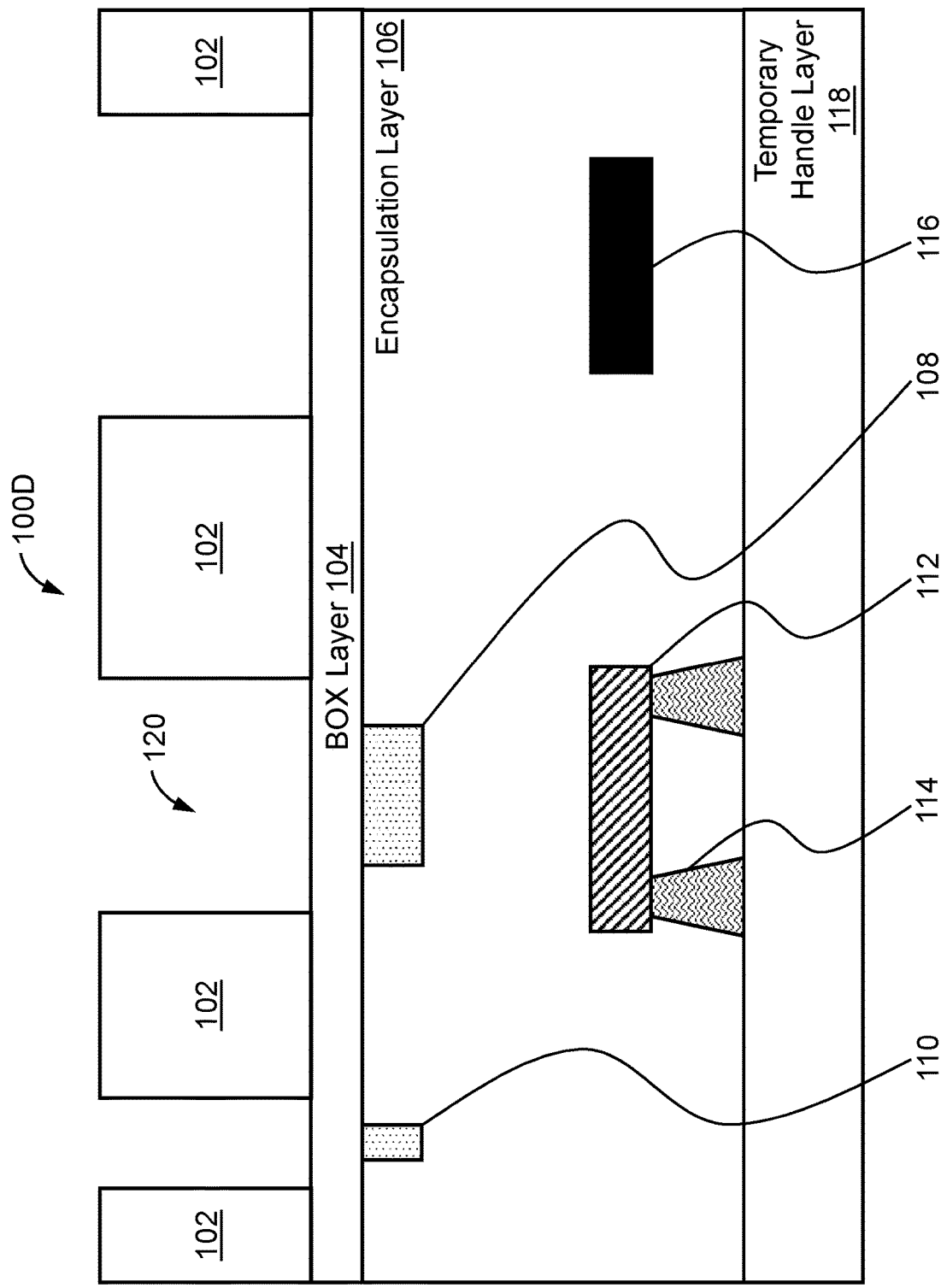
FIG. 1D is a schematic diagram of a cross-sectional view of an example PIC.

FIG. 1D shows a cross-sectional view of an example PIC 100D formed by removing portions of the handle layer 102 from the PIC 100C of FIG. 1C. Cavities 120 are formed by removing portions of the handle layer 102. Formation of the cavities 120 may be accomplished by local patterning using lithography and selective etching. In some examples, the cavities 120 may be formed under one or more corresponding devices that are critical to operation of the PIC 100D or that are more susceptible to losses or modifications from interactions with the handle layer 102. In some examples, a dielectric layer can be deposited into the cavities 120 to protect the cavities 120 and to allow for additional fabrication processes (e.g., adding bumps, through-chip vias, or redistribution layers). In other examples, regions of the BOX layer 104 exposed by the cavities 120 can be partially or wholly etched such that the BOX layer 104 can have a non-zero thickness in the partially etched regions or can be completely removed in the wholly etched regions. In such examples, the partially or wholly etched regions of the BOX layer 104 can be left empty (i.e., filled with air) or additional materials may be added to the partially or wholly etched regions. The additional materials can have specific optical properties (e.g., index of refraction) that can be utilized in sensing applications, for example. The dimensions of the cavities 120 can be designed based at least in part on the desired mechanical reliability of the handle layer 102 and the desired isolation of the one or more corresponding devices from the handle layer 102. For example, the mechanical reliability may be enhanced if the cavities 120 are as small as possible, while the isolation of the one or more corresponding devices may be enhanced if the cavities 120 are as large as possible. Consequently, relevant device simulation and cavity design can be performed so as to obtain a compromise between these and other criteria.

Figure 1E:
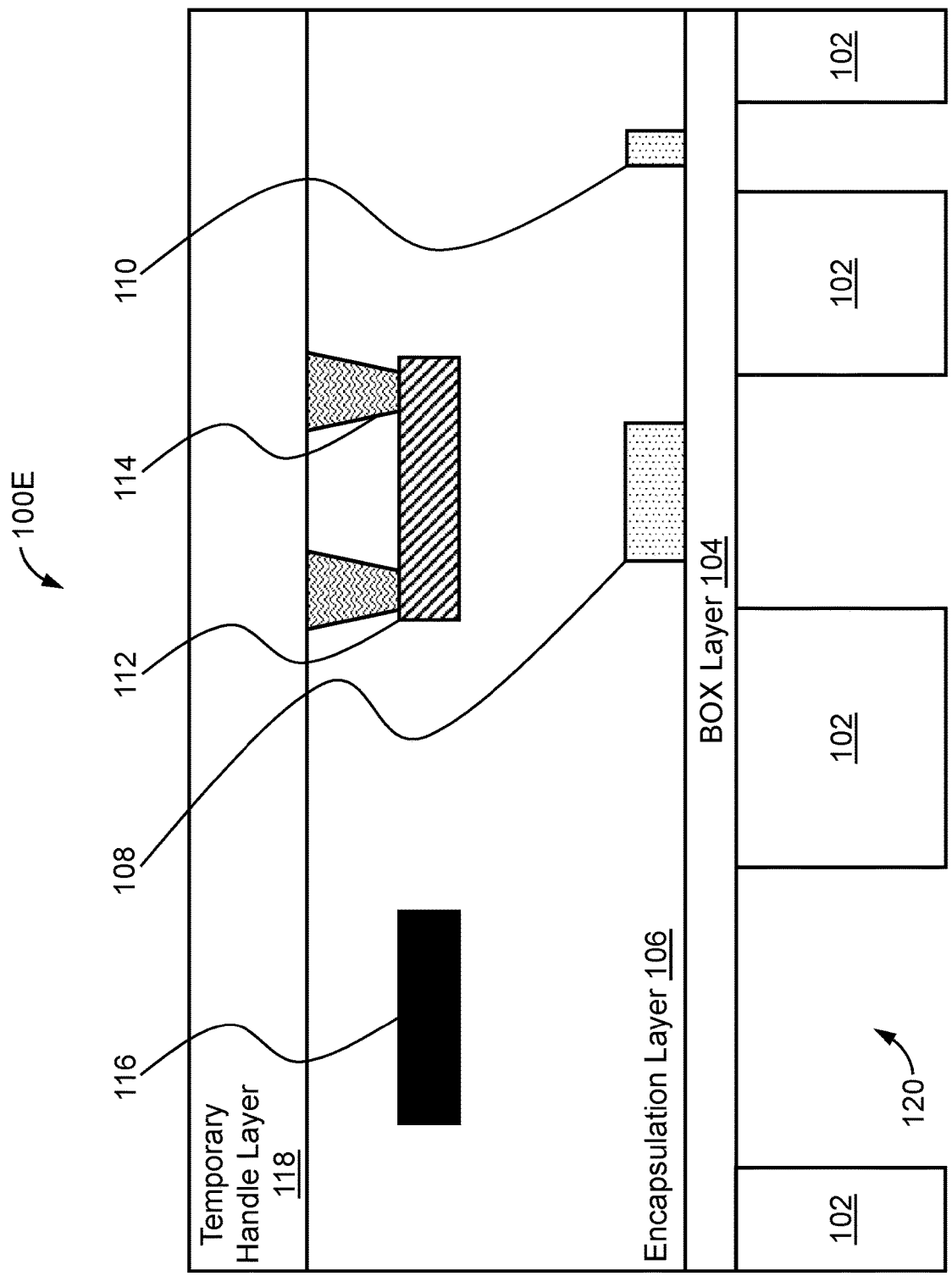
FIG. 1E is a schematic diagram of a cross-sectional view of an example PIC.

FIG. 1E shows a cross-sectional view of an example PIC 100E that results from flipping the PIC 100D of FIG. 1D. In some examples, the PIC 100E can be picked up by securing the remaining portions of a handle layer 102 to a pickup tool (e.g., an electrostatic chuck).

Figure 1F:
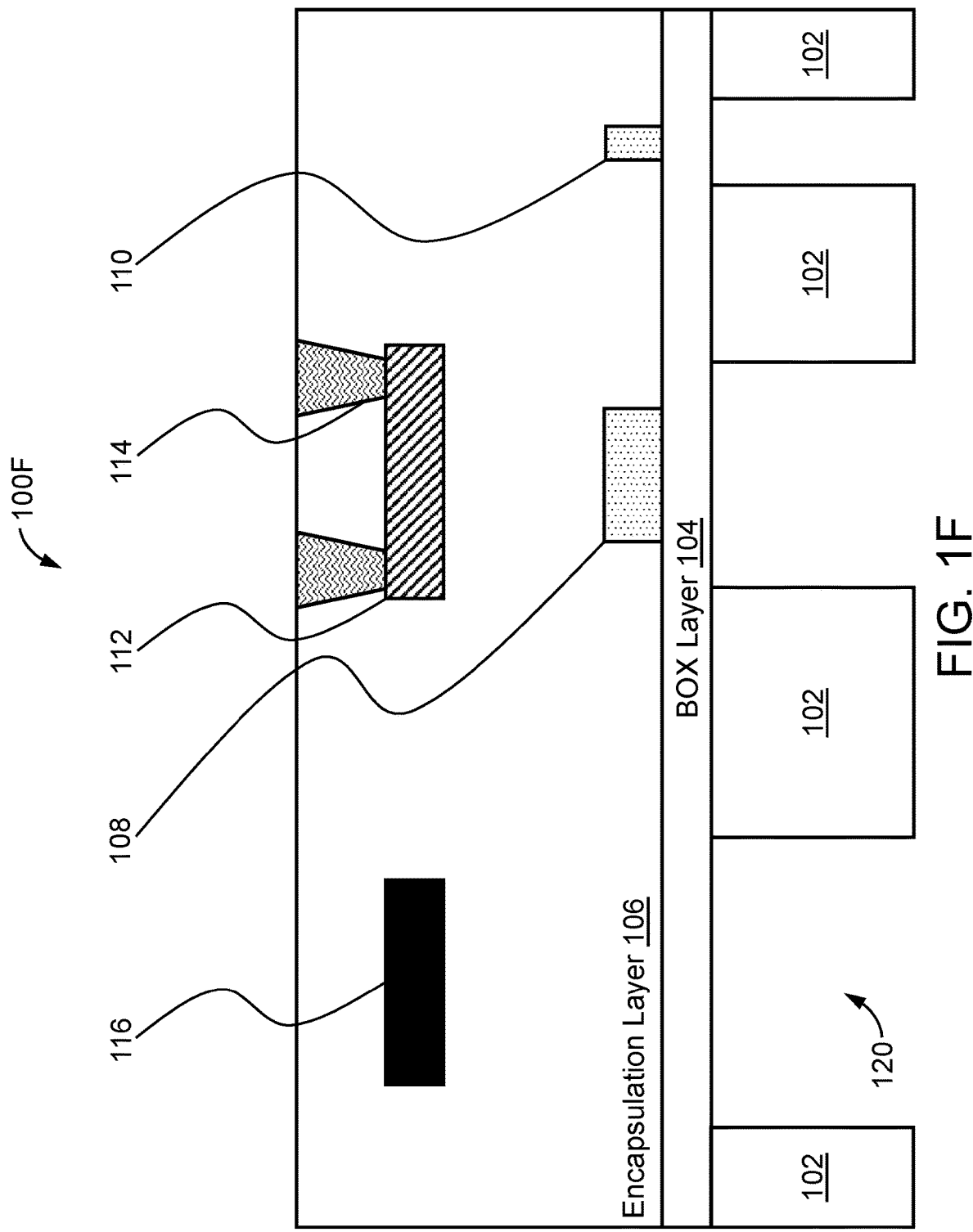
FIG. 1F is a schematic diagram of a cross-sectional view of an example PIC.

FIG. 1F shows a cross-sectional view of an example PIC 100F formed by removing the temporary handle layer 118 from the PIC 100E of FIG. 1E.

In some examples, material can be deposited within the removed portions of the handle so as to achieve desired optical, thermal, or electrical properties. For example, a material with a low thermal conductivity may be deposited within the removed portions so as to reduce heat dissipation, or a material with a specified index of refraction may be deposited within the removed portions so as to provide a desired speed of light within a portion of the PIC. In some examples, the removed portions remain at least partially empty of additional deposited material and comprise air so as to increase the speed of a RF mode that propagates in proximity to the removed portions (e.g., within three mode field diameters). In such examples, the increased speed of the RF mode may allow for better velocity matching of the RF mode with an optical mode.

Figure 2A:
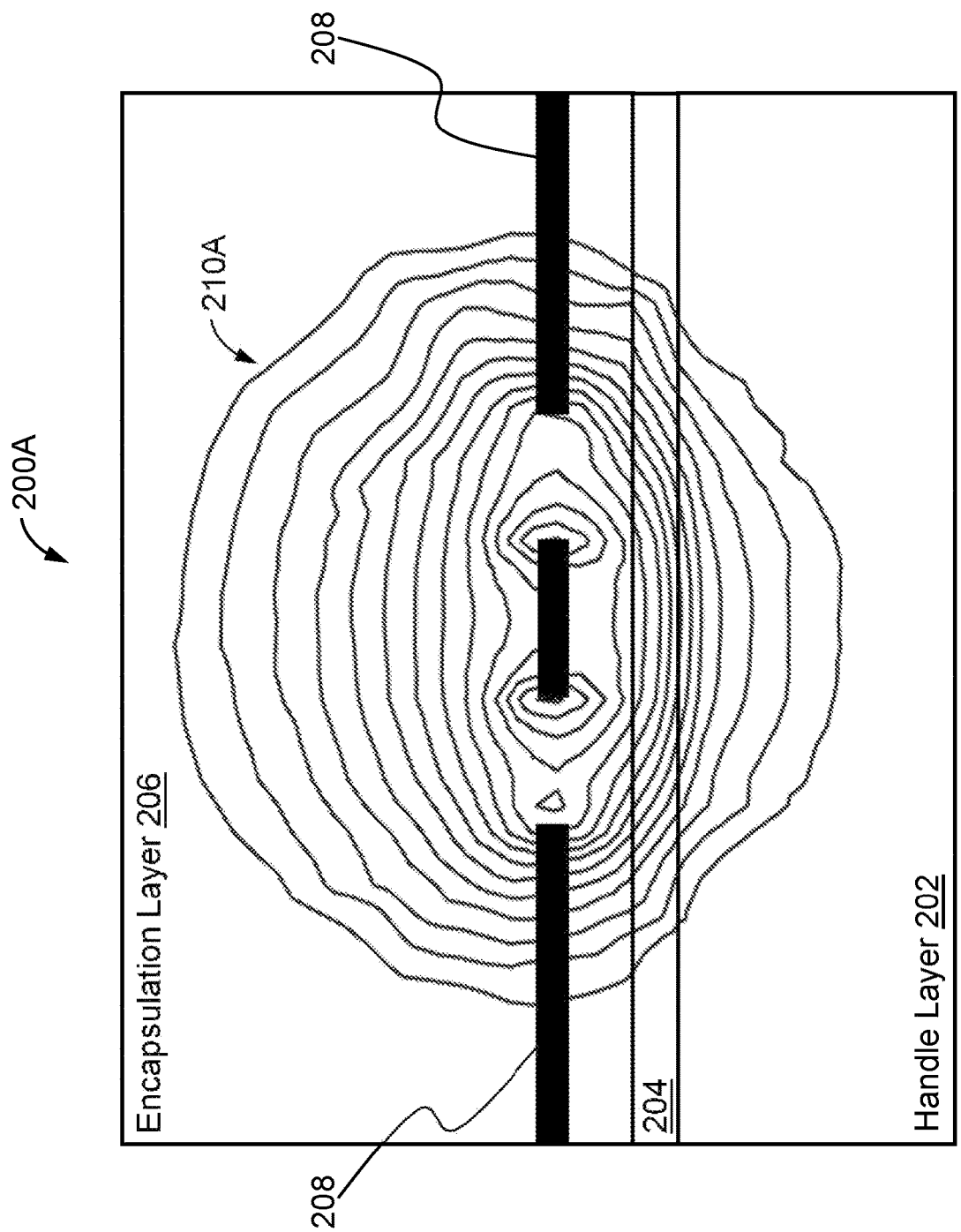
FIG. 2A is a schematic diagram of a cross-sectional view of an example PIC.

FIG. 2A shows a cross-sectional view of an example PIC 200A comprising a handle layer 202, a BOX layer 204, an encapsulation layer 206, and a transmission line 208 guiding a first RF mode 210A that has a frequency of 100 GHz. The first RF mode 210A was determined from a simulation and extends substantially into the handle layer 202.

Figure 2B:
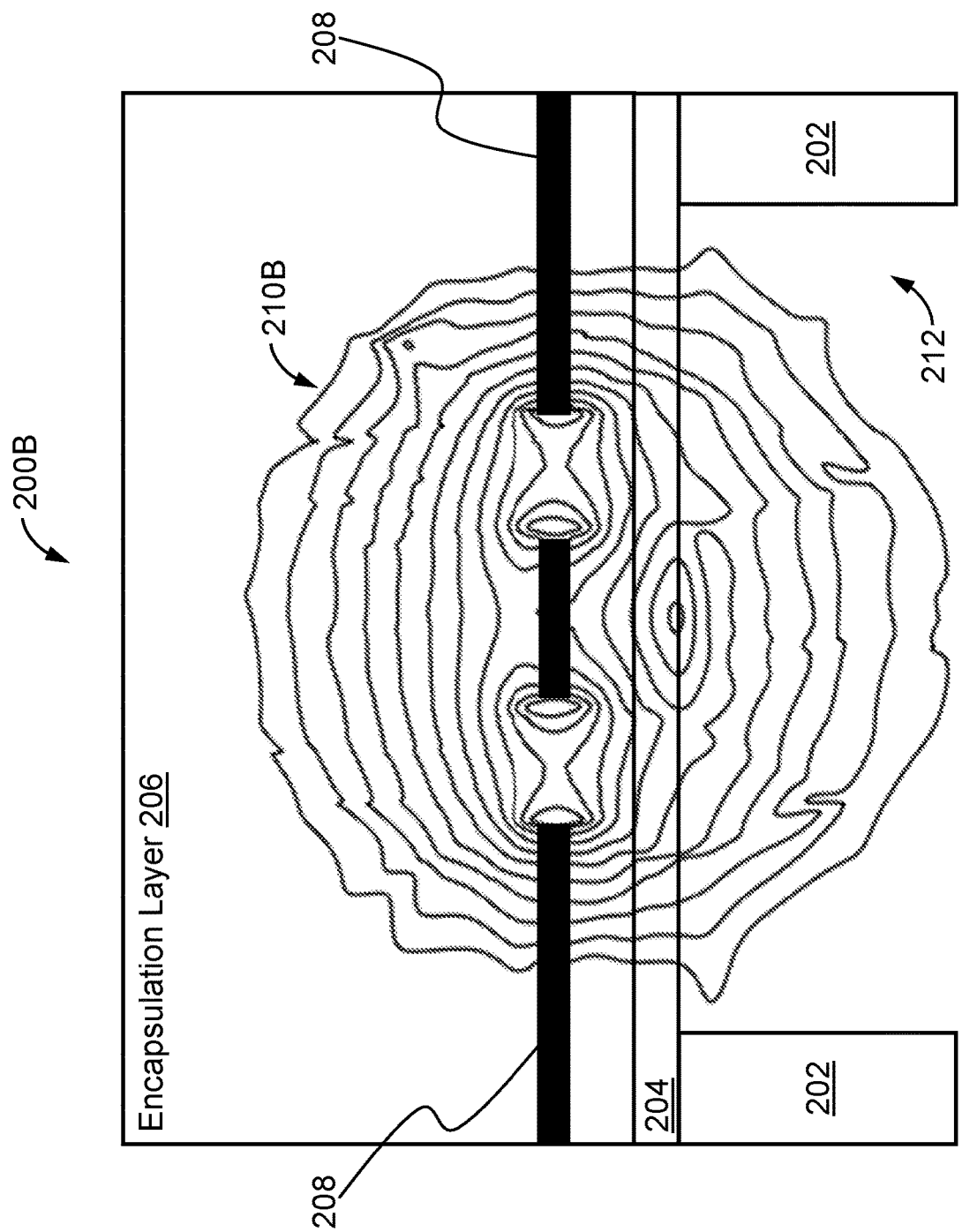
FIG. 2B is a schematic diagram of a cross-sectional view of an example PIC.

FIG. 2B shows a cross-sectional view of an example PIC 200B comprising a handle layer 202 that has had a portion removed, a BOX layer 204, an encapsulation layer 206, and a transmission line 208 guiding a second RF mode 210B that has a frequency of 100 GHz. The second RF mode 210B was determined from a simulation and extends substantially into a cavity 212 formed by the removal of a portion of the handle layer 202.

Figure 3A:
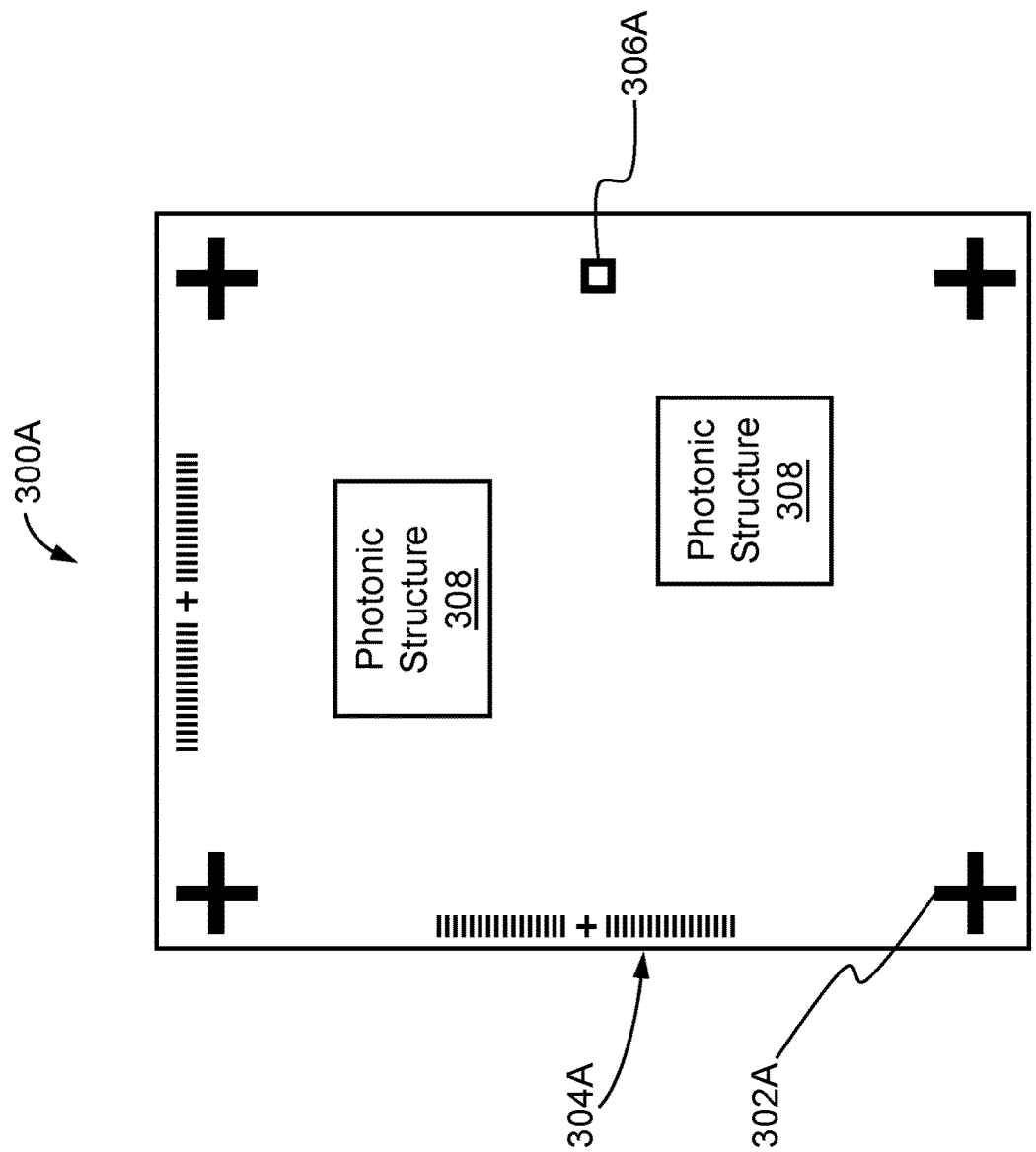
FIG. 3A is a schematic diagram of an example PIC, as viewed from above.

FIG. 3A shows an example PIC 300A, as viewed from above, that includes positive-tone crosses 302A, positive-tone vernier scales 304A, and a positive-tone box 306A, each of which are example alignment structures that can be generated on the front-side of the PIC 300A by a positive-tone front-side mask (not shown). The PIC 300A also includes photonic structures 308 (e.g., transmission lines, temperature-tunable optical devices, or SSCs).

Figure 3B:
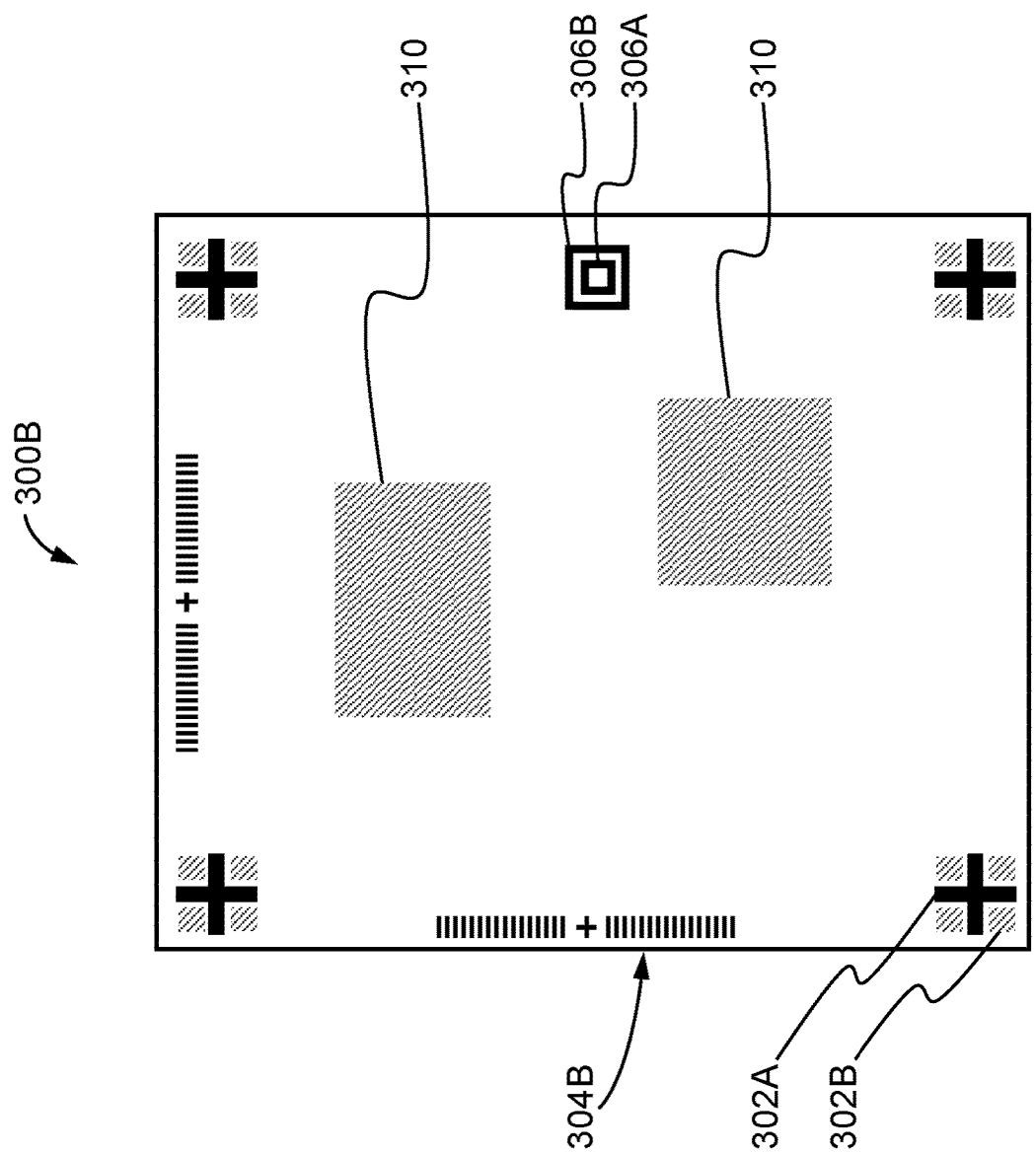
FIG. 3B is a schematic diagram of an example PIC with mask, as viewed from below.

FIG. 3B shows an example PIC with back-side mask 300B, as viewed from below. From this view, the back-side mask is overlaid on the PIC and alignment structures from the top-side of the PIC (e.g., as shown in FIG. 3A) can be detected from an optical signal that propagates through at least a portion of the PIC. The alignment structures from the top-side of the PIC can be used in conjunction with the back-side mask so as to properly align the PIC and the back-side mask. Furthermore, the locations of photonic structures (e.g., the photonic structures 308 of FIG. 3A) can be determined with respect to the alignment structures from the top-side of the PIC. Thus, the back-side mask includes photonic structure footprints 310 that correspond to the locations of photonic structures located on the top-side of the PIC. In general, the size and shape of the photonic structure footprints 310 can be larger, smaller, or the same as the physical footprint of the photonic structures on the top-side of the PIC. The back-side mask includes a negative-tone cross 302B that is complementary to the positive-tone cross 302A of FIG. 3A, negative-tone vernier scales 304B, and a negative-tone box 306B, each of which can be used to align the back-side mask to the PIC from the back-side. For example, the back-side mask can be positioned and oriented such that the negative-tone vernier scales 304B overlap with the positive-tone vernier scales 304A of FIG. 3A. Additionally, the back-side mask can be positioned such that all sides of the negative-tone box 306B are approximately the same distance from corresponding sides of the positive-tone box 306A of FIG. 3A.

Referring again to FIGS. 3A and 3B, typical dimensions of the alignment structures can be several microns (e.g., between 1 and 20 µm) such that the features of the alignment structures can be visible directly through a handle layer (not shown) using IR lithography alignment. In some examples, smaller features of the alignment structures can also suffice (e.g., if the lithography tool has enough sensitivity, or if the handle layer has been thinned by performing a BSG process). The back-side mask can be positioned and oriented with respect to the alignment structures by imaging through the handle layer. In general, more accurate lithography processes can be used in combination with less silicon width being etched. For the mechanical reliability of the PIC 300A of FIG. 3A and the PIC 300B of FIG. 3B, it can be beneficial to etch less of the handle layer. If the alignment of the back-side mask and the PIC is not accurate, the design may compensate by having larger etched regions that also degrade the mechanical reliability.

In general, the removal of portions of a handle layer of a PIC, as disclosed herein, can be combined with other fabrication processes. In some examples, electrically conductive through-chip vias (e.g., through-silicon vias), redistribution layers (e.g., electrically conductive planes formed on the front-side or on the back-side of the PIC), bumps (e.g., formed by a bumping process), or copper pillars can be fabricated before or after removing portions of the handle layer. Within the removed portions of the handle layer, a thin film of material (e.g., silicon dioxide) can be deposited to enable further processing. In such examples, the thin film of material can be an electrical insulator so as to prevent electrical shorts from forming between the sidewalls of the handle, which can be electrically conductive (e.g., silicon), and deposited electrically conductive material (e.g., associated with through-chip vias, redistribution layers, bumps, or copper pillars).

Figure 4A:
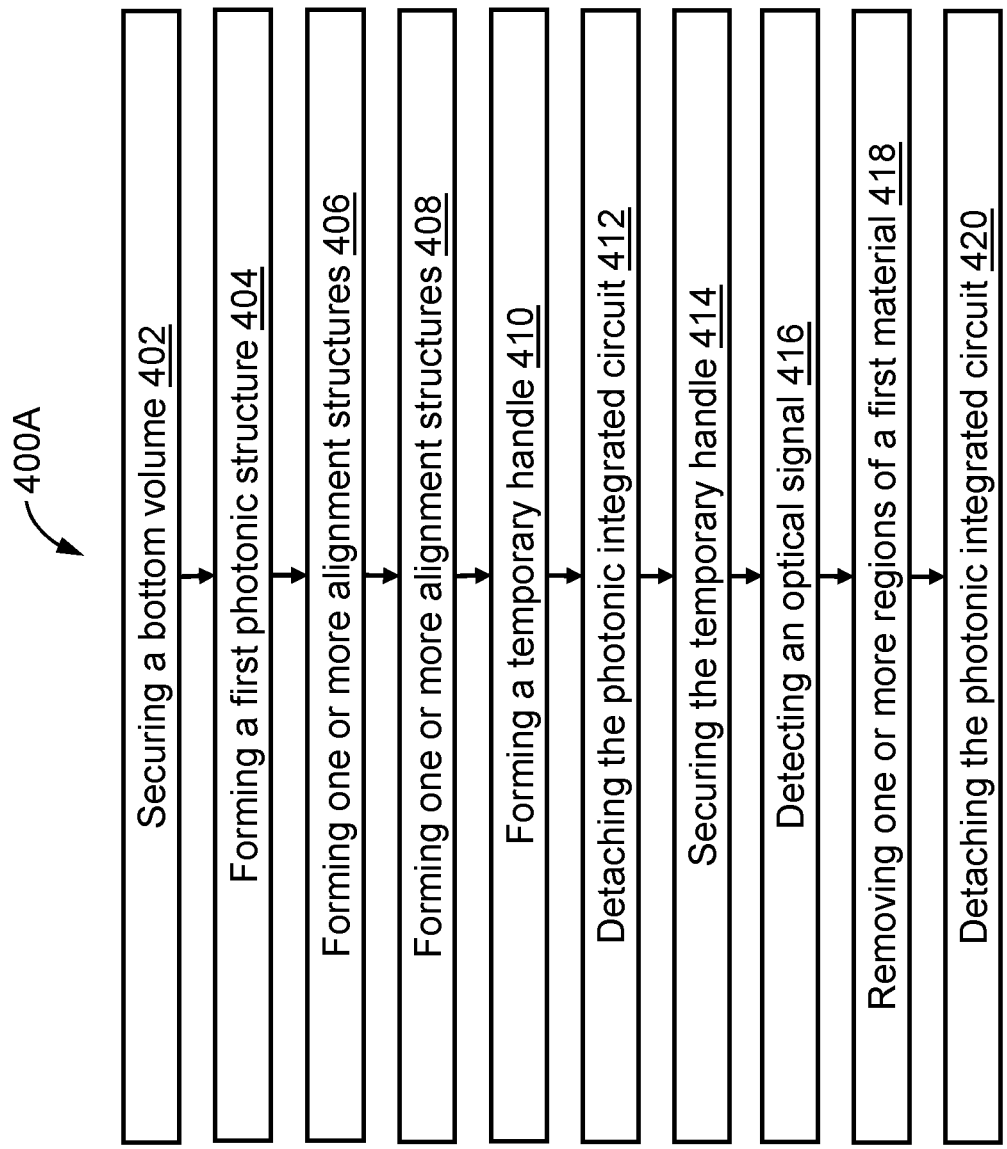
FIGS. 4A and 4B are flowcharts of example back-side processing procedures.

FIG. 4A shows a flowchart of an example back-side processing procedure 400A. The back-side processing procedure 400A comprises securing a bottom volume of a photonic integrated circuit, located underneath a middle volume of the photonic integrated circuit, to a first tool portion at a first time. The back-side processing procedure 400A further comprises forming a first photonic structure in a top volume of the photonic integrated circuit, the top volume located on top of the middle volume. The back-side processing procedure 400A further comprises forming one or more alignment structures in the middle volume or in the top volume, forming a temporary handle on top of the top volume, detaching the photonic integrated circuit from the first tool portion, and securing the temporary handle to a second tool portion at a second time. The back-side processing procedure 400A further comprises detecting an optical signal that traverses through the middle volume. The back-side processing procedure 400A further comprises removing one or more regions of a first material from the bottom volume based at least in part on the detected optical signal and a first set of spatial coordinates specifying one or more two-dimensional positions, with respect to the alignment structures, of one or more portions of the first photonic structure. The back-side processing procedure 400A further comprises detaching the photonic integrated circuit from the second tool portion. In some examples of the back-side processing procedure 400A, the first material is characterized by a first index of refraction and the middle volume comprises a second material characterized by a second index of refraction smaller than the first index of refraction.

Figure 4B:
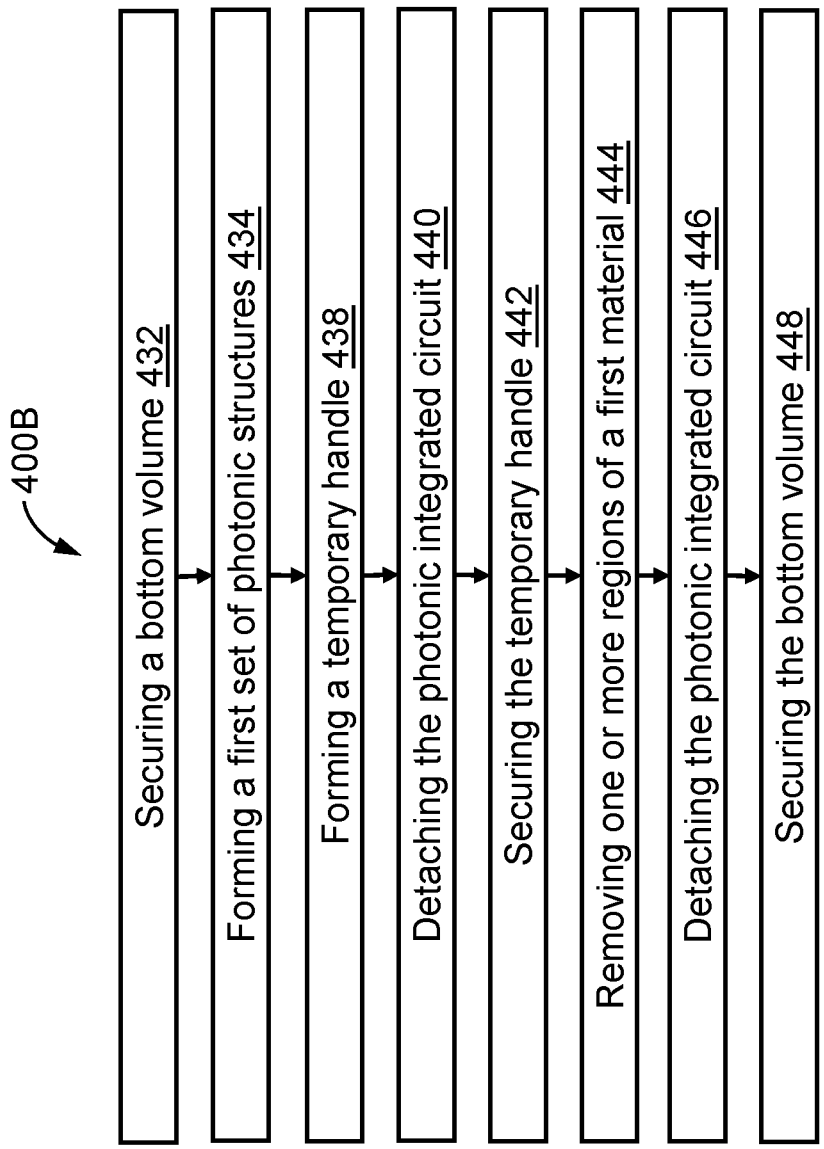

FIG. 4B shows a flowchart of an example back-side processing procedure 400B. The back-side processing procedure 400B comprises securing a bottom volume of a photonic integrated circuit, located underneath a middle volume of the photonic integrated circuit, to a first tool portion at a first time. The back-side processing procedure 400B further comprises forming a first set of photonic structures in a top volume of the photonic integrated circuit, the top volume located on top of the middle volume. The back-side processing procedure 400B further comprises forming a temporary handle on top of the top volume, detaching the photonic integrated circuit from the first tool portion, securing the temporary handle to a second tool portion at a second time, and removing one or more regions of a first material from the bottom volume based at least in part on a first set of spatial coordinates specifying one or more two-dimensional positions of one or more portions of a photonic structure in the first set of photonic structures. The back-side processing procedure 400B further comprises detaching the photonic integrated circuit from the second tool portion and securing the bottom volume to a third tool portion at a third time. In some examples of the back-side processing procedure 400B, the first material is characterized by a first index of refraction and the middle volume comprises a second material characterized by a second index of refraction smaller than the first index of refraction.

Thus, in view of the foregoing description of any apparatus, method, article of manufacture, or system, and corresponding portions of the drawings referenced from the figures, it should be understood by a person of ordinary skill in the art, that in one aspect, in general, an article of manufacture comprises a bottom volume of a photonic integrated circuit, the bottom volume comprising a first region composed of a first material characterized by a first index of refraction and having a first thickness, and one or more thinned regions in which at least a portion of the first material is absent or has a thickness less than the first thickness; a middle volume of the photonic integrated circuit, located on top of the bottom volume, the middle volume comprising a second material characterized by a second index of refraction smaller than the first index of refraction; and a top volume of the photonic integrated circuit, located on top of the middle volume, the top volume comprising one or more alignment structures, and a first photonic structure in a set of photonic structures; where the top volume and the middle volume are in contact at an interface plane; where a first set of spatial coordinates specify one or more two-dimensional positions, with respect to the alignment structures, of one or more portions of the first photonic structure in a first plane that is parallel to the interface plane; where the first set of spatial coordinates specify one or more two-dimensional positions, with respect to the alignment structures, within at least one thinned region in a second plane that is parallel to the interface plane.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture comprising:
 a bottom volume of a photonic integrated circuit, the bottom volume comprising
  a first region composed of a first material characterized by a first index of refraction and having a first thickness, and
  one or more thinned regions in which at least a portion of the first material is absent or has a thickness less than the first thickness;
 a middle volume of the photonic integrated circuit, located on top of the bottom volume, the middle volume comprising a second material characterized by a second index of refraction smaller than the first index of refraction; and a top volume of the photonic integrated circuit, located on top of the middle volume, the top volume comprising one or more alignment structures, and a first photonic structure in a set of photonic structures;

where the top volume and the middle volume are in contact at an interface plane;

where a first set of spatial coordinates specify one or more two-dimensional positions, with respect to the alignment structures, of one or more portions of the first photonic structure in a first plane that is parallel to the interface plane;

where the first set of spatial coordinates specify one or more two-dimensional positions, with respect to the alignment structures, within at least one thinned region in a second plane that is parallel to the interface plane; and where at least one of the one or more thinned regions is formed by removing a portion of the first material based at least in part on
an optical signal detected after the optical signal traverses through the middle volume, and
a first set of spatial coordinates specifying one or more two-dimensional positions, with respect to the alignment structures, of one or more portions of the first photonic structure.

2. The article of manufacture of claim 1, where the first set of spatial coordinates are associated with a first shape of the first photonic structure in the first plane.

3. The article of manufacture of claim 1, where the middle volume further comprises
a second region composed of the second material and having a second thickness; and
one or more secondary thinned regions, located above respective thinned regions of the bottom volume, in which at least a portion of the second material is absent or has a thickness less than the second thickness.

4. The article of manufacture of claim 3, where the middle volume further comprises a third material, different from the second material, located in at least one of the one or more secondary thinned regions.

5. The article of manufacture of claim 1, further comprising metallic bumps located underneath the bottom volume.

6. A method comprising:
securing a bottom volume of a photonic integrated circuit, located underneath a middle volume of the photonic integrated circuit, to a first tool portion at a first time;
forming a first photonic structure in a top volume of the photonic integrated circuit, the top volume located on top of the middle volume;
forming one or more alignment structures in the middle volume or in the top volume;
forming a temporary handle on top of the top volume;
detaching the photonic integrated circuit from the first tool portion;
securing the temporary handle to a second tool portion at a second time;
detecting an optical signal that traverses through the middle volume;
removing one or more regions of a first material from the bottom volume based at least in part on
the detected optical signal, and
a first set of spatial coordinates specifying one or more two-dimensional positions, with respect to the alignment structures, of one or more portions of the first photonic structure; and
detaching the photonic integrated circuit from the second tool portion;
where the first material is characterized by a first index of refraction and the middle volume comprises a second material characterized by a second index of refraction smaller than the first index of refraction.

7. The method of claim 6, further comprising forming a heating element in the top volume.

8. The method of claim 6, where the bottom volume is secured to the first tool portion at the first time by electrostatic forces.

9. The method of claim 6, where the temporary handle is secured to the second tool portion at the second time by electrostatic forces.

10. The method of claim 6, further comprising:
forming a first set of photonic structures in the top volume of the photonic integrated circuit, the first set of photonic structures including the first photonic structure; and
securing the bottom volume to a third tool portion at a third time.

11. The method of claim 10, further comprising, after the third time, forming a second set of photonic structures within the photonic integrated circuit.

12. The method of claim 11, where at least one of the photonic structures in the second set of photonic structures is located in the top volume.

13. The method of claim 11, where at least one of the photonic structures in the second set of photonic structures is a through-chip via that passes completely through the photonic integrated circuit.

14. The method of claim 10, where the first set of photonic structures comprises at least one of a metallic waveguide, an optical waveguide, or an electro-optical device.

15. The method of claim 10, further comprising, after the third time, removing the temporary handle.

16. The method of claim 10, further comprising, after the second time and before the third time, forming one or more layers of a third material in contact with the one or more removed regions.

17. The method of claim 10, where the first tool portion is a portion of a first tool and the third tool portion is a portion of the first tool.

18. The method of claim 17, where the second tool portion is a portion of the first tool.

19. The method of claim 17, where the first tool portion and the third tool portion are the same.

20. The method of claim 10, where the bottom volume is secured to the first tool portion at the first time and is secured to the third tool portion at the third time by electrostatic forces.

* * * * *